UNITED STATES PATENT OFFICE.

JOHN H. PFINGSTEN, OF MILWAUKEE, WISCONSIN, ASSIGNOR TO PRESTO COLOR COMPANY, OF CUDAHY, WISCONSIN, A CORPORATION OF WISCONSIN.

COLORING-MATTER FOR LEATHER AND METHOD OF USING THE SAME.

1,371,572.    Specification of Letters Patent.    Patented Mar. 15, 1921.

No Drawing.    Application filed July 2, 1917. Serial No. 178,287.

*To all whom it may concern:*

Be it known that I, JOHN H. PFINGSTEN, a citizen of the United States, residing at Milwaukee, county of Milwaukee, and State of Wisconsin, have invented a certain new and Improved Coloring-Matter for Leather and Methods of Using the Same, of which the following is a specification.

My invention relates to improvements in coloring matter for leather and method of coloring the leather therewith. The general object of my invention is to produce a coloring matter which, while being permanent and non-fading, can be quickly and cheaply applied to leather without the necessity of boiling and use of mordants, etc., and which gives a uniformity of color and economy of operation beyond that which has hitherto been known.

Leather has heretofore been colored by dyeing with various kinds of dyes such as logwood, fustic, cochineal, and of late more particularly the so-called anilin dyes or coal-tar dyes. The use of dyes of this character is open to the following objections: They must be previously dissolved in water, ordinarily by boiling; the leather to be dyed must be specially treated before dyeing to prepare it for the dye; the use of mordants to obtain satisfactory results is in every case practically essential; the dyeing must be carried on at certain temperatures, ordinarily close to boiling point; in most cases a certain amount of acid must be used which has a deleterious effect upon the fiber of the leather; and in no case can all of the dye stuff be used, a considerable amount necessarily remaining in solution in the water. Further than this, it has been impossible to dye different runs of leather to exactly the same shade by means of dye stuffs which are held in solution without repeated tonings up so as to match the shades. Thus for example, in making a chocolate color by means of coal-tar dyes it requires expert work to produce uniformity of shade, as many as twenty shades of chocolate being produced from the same run of dye unless great care is taken.

All of the dye stuffs heretofore used, so far as I am aware, operate upon the principle of their being dissolved in water and then precipitated out upon the fibers of the leather by chemical action generally aided by the mordant or heat, or both. I have discovered, however, that by making a coloring matter of finely divided insoluble pigment, suspending it in a fluid and then agitating the leather to be colored and the fluid with respect to each other, I am enabled to deposit the pulverulent pigment in the interstices of the leather, thus producing a permanent, definite color thereon which will not fade or crock, and at the same time using up all of the coloring matter. When my new coloring matter and process are used I can color a large number of pieces of leather at one time, produce a uniform shade on each of them, and use up all of the coloring matter, the fluid in which it had been suspended, upon being drawn off after the operation being substantially colorless. It is, however, necessary in order that my coloring matter and process give satisfactory results that the leather to which they are to be applied be porous, i. e., it must either be a split or sufficient of the grain must be buffed off so that the coloring matter can enter into and find lodgment in the pores of the leather. My process is quite different from painting on leather, in that when leather is painted the surface only is coated and the pigment is caused to stick to the leather by chemical changes, principally oxidation of the oils, and the leather is rendered stiff and hard. In my process the leather is neither painted nor dyed as those words are ordinarily used, but the finely divided coloring matter is forced into and intimately held in the reticulations in the leather, which is left soft and pliable.

A preferred form of my new coloring matter is produced as follows: I have selected by way of specific illustration a chocolate color because of the difficulty in the past of producing uniformity of shade therein, but it is to be understood that I am not limiting myself to the production of that color, as I reserve the right to vary the colors and ingredients within the scope of the appended claims. To produce a chocolate color I take the following earthy pigments such as are commonly used in the painting art: Six pounds burnt sienna, eight pounds Indian red, four pounds burnt umber, one and three-quarter pounds yellow ocher, one-fourth pound lamp black, total twenty pounds. These ingredients are then finely pulverized in an ordinary paint grinder or pugging mill until they will go through a mesh of fifty to the inch. The more uniform the grinding and the finer divided the resultant product the better results will be obtained.

In case the leather contains an excess of fat I may at my option add a small amount of soda ash, sodium bicarbonate or other alkali so as to remove the excess of fat. Thus, if the stock has been fat liquored I may add about four per cent. by weight of soda ash to the pigments above mentioned.

This product is dry, comparatively cheap, easily portable, and is not affected by time, changes in climatic conditions, etc., neither do the colors that it makes crock or fade on exposure to light.

In order to apply my improved color I suspend it in a fluid and agitate either the fluid or the leather therein. In my preferred form I take the leather, which as previously stated, must be porous, wash it twenty minutes in water of a temperature of 150 to 175 degrees F. in a revolving drum. The drum I use is six feet wide and eight feet high, outside dimensions, and rotates between 16 and 20 R. P. M., although any suitable apparatus can be used. Preferably the leather has been previously fat liquored and dried. I then throw into the drum a batch of my improved color made up as aforesaid, i. e., approximately 21 pounds thereof, and continue the revolutions of the drum for about twenty minutes. The water is then drawn off, the leather removed and dried. On running off the water it will be found that substantially all of the coloring matter is removed therefrom, the water being substantially colorless, and the coloring matter will be found to have uniformly colored the leather by physical penetration into the interstices thereof so as to form a uniform, permanent color thereon. Aside from the effect of the alkali acting upon the grease in the leather and saponifying it (and which is purely optional), I know of no chemical action in my process; it is purely a physical penetrating coloring in contradistinction to chemical dyeing and surface painting as have heretofore been practised.

I do not want to be understood as limiting myself to the use of the particular pigments heretofore referred to as I can use any pigment that is insoluble in water, but which when finely pulverized can be suspended therein by agitation. Neither do I desire to limit myself to the use of water as the fluid medium for practising my process as other media such as air may be substituted therefor.

Having fully described my invention, I claim:

1. A coloring matter suitable for coloring leather by suspension in a fluid and consisting of pulverulent pigment insoluble in said fluid and containing approximately four per cent. by weight of sodium bicarbonate.

2. A process of coloring leather which consists in suspending pulverulent, insoluble pigment in a fluid and agitating said fluid and leather with respect to each other so that the pigment is uniformly deposited in the interstices of the leather.

3. A process of coloring leather which consists in suspending pulverulent, insoluble pigment in water and agitating the leather therein in the presence of heat so that the pigment is uniformly deposited in the interstices of the leather.

4. A process of coloring leather which consists in dissolving a fat saponifying agent and suspending a pulverulent, insoluble pigment in water, agitating the leather therein in the presence of heat so that the pigment is uniformly deposited in the interstices of the leather, and the excess of fat saponified.

In testimony whereof I hereunto affix my signature in the presence of two witnesses.

JOHN H. PFINGSTEN

Witnesses:
  E. Helmlof,
  N. R. Helmlof.